United States Patent [19]

Adams et al.

[11] Patent Number: 4,690,688

[45] Date of Patent: Sep. 1, 1987

[54] FOAM CONTROL

[75] Inventors: Graham Adams, Brussels, Belgium; Martin A. Jones, S. Glamorgan, Wales

[73] Assignee: Dow Corning, Ltd., Barry, Wales

[21] Appl. No.: 831,954

[22] Filed: Feb. 24, 1986

[30] Foreign Application Priority Data

Mar. 29, 1985 [GB] United Kingdom ................ 8508254
Jan. 30, 1986 [GB] United Kingdom ................ 8602234

[51] Int. Cl.$^4$ ............................................. C10L 1/28
[52] U.S. Cl. ........................................... 44/76; 44/77
[58] Field of Search ..................................... 44/76, 77

[56] References Cited

U.S. PATENT DOCUMENTS 2,862,885 12/1958 Nelson et al. ................ 44/76 X
2,917,480 12/1959 Bailey et al. ................ 44/76 X
2,992,083 7/1961 Bluestein ................ 44/76 X
3,057,901 10/1962 Plueddemann ................ 252/49.6 X
3,233,986 2/1966 Morehouse ................ 44/76

Primary Examiner—Ferris H. Lander
Assistant Examiner—Ellen McAvoy
Attorney, Agent, or Firm—Alexander Weitz

[57] ABSTRACT

The specification discloses a method of controlling foaming of liquid hydrocarbon fuels (e.g. diesel fuel and jet fuel) by inclusion therein of certain siloxane polyoxyalkylene copolymer as antifoam agents. The copolymers have an average molecular formula such that oxyalkylene groups of the copolymer provide from about 25% to about 65% by weight of the copolymer. Preferred copolymers are according to the general formula $$Me_3SiO(Me_2SiO)_x(MeR'SiO)_ySiMe_3$$

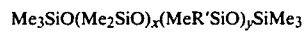

in which each Me represents a methyl group, each R' represents a group according to the general formula $$Q(OA)_nOZ$$

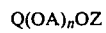

in which Q represents a divalent group attached to the silicon atom, each A represents an ethylene group, n has a value from 10 to 15, Z represents a hydrogen atom or a group OCR" in which R" represents a monovalent group and the ratio x:y lies in the range 1:1 to 11:1, more preferably in the range 3:1 to 7:1.

8 Claims, No Drawings

FOAM CONTROL

This invention relates to foam control and is particularly concerned with controlling foaming in hydrocarbon liquids.

In the processing, transportation and storage of hydrocarbon liquids, it is frequently observed that foaming occurs as the liquid is passed from one vessel to another. For example, as liquid hydrocarbon fuel is passed quickly into a storage tank a foam may develop at the surface of the fuel and, in many cases, the extent of foaming is sufficiently significant and persistent to require a reduction in the rate of passage of the liquid fuel into the vessel. It is highly desirable to provide means for controlling foaming so as to permit high rates of passage.

Various proposals have been made for controlling foaming of various grades of hydrocarbon liquids by use of additives for example silicone products. However, the reduction of foaming of diesel fuels by use, in extremely small quantities, of ecologically and technically acceptable silicone additives has not been satisfactorily solved prior to this invention.

U.S. patent specification No. 3,233,986 is concerned with siloxane polyoxyalkylene block copolymers as antifoam agents and discloses the use of a wide variety of such copolymers to reduce the tendency of organic liquids to foam. Organic liquids mentioned in said specification include inter alia various hydrocarbon liquids including liquid hydrocarbon fuels e.g. kerosene, gasoline and diesel fuel. Among the many copolymers advocated in said specification are those comprising groups represented by the formula:

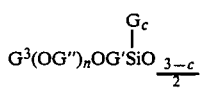

$$G^3(OG'')_n OG'SiO_{\frac{3-c}{2}}$$
with $G_c$ substituent wherein $G_3$ is a member selected from the group consisting of the hydrogen atom and the monovalent hydrocarbon groups, $G''$ is an alkylene radical containing at least two carbon atoms, $G'$ is a divalent hydrocarbon radical, G is a monovalent hydrocarbon radical, n has a value of at least two and c has a value from 0 to 2 inclusive.

U.S. specification No. 3,233,986 teaches that at least 60% by weight of the groups $OG''$ must be oxyethylene or oxypropylene groups and that other oxyalkylene groups may be present in the groups $OG''$. It is said that each oxyalkylene block preferably contains from four to thirty groups $OG''$. The specification teaches that the number of oxyalkylene groups ($OG''$) and that part of the average molecular weight of the copolymer that is attributable to the oxyalkylene blocks is not critical, and that useful copolymers can contain siloxane blocks and oxyalkylene blocks in any relative amount.

U.S. specification No. 3,233,986 states that the amount of the copolymers used with a liquid hydrocarbon is not critical and can range from 5 to 2000 parts by weight of the copolymer per million parts by weight of the liquid and that particularly good results are often obtained when from 100 to 500 parts by weight of the copolymer are used per million parts of the liquid.

We have found that some copolymers of the type disclosed in U.S. specification No. 3,233,986 when employed in certain hydrocarbon fuels, particularly when used in amounts of less than 100 parts copolymer per million parts hydrocarbon, do not act to reduce the tendency of the hydrocarbon to foam but rather to increase the tendency of the hydrocarbon to foam. We have found that the proportion of oxyalkylene groups present is critical to the performance of polysiloxane polyoxyalkylene copolymers as foam reducing agents in certain hydrocarbon fuels, particularly when smaller amounts of copolymer are employed.

Hydrocarbon fuels of particular interest in the context of the present invention are diesel fuel and jet fuel.

By the expression "diesel fuel" where used herein is meant gas oil and fuel oil including those materials which are referred to as light domestic and heating oils and diesel fuel and irrespective of whether they are intended for vehicular, marine, heating or other use. These materials are loosely characterised as having a viscosity of not more than 115″ Redwood 1 at 38° C. and a boiling point in the range of about 200° C. to about 380° C. Particularly embraced within the expression are those hydrocarbon liquids having a viscosity of about 30 to about 40″ Redwood 1 at 38° C. including those having a viscosity at 20° C. in the range of about 2.9 to about 10.2 centistokes and at 38° C. in the range of about 1.6 to about 6.0 cS, a carbon residue (Conradson) of <0.2% by weight, a water content of <0.05% by weight, a sulphur content of <1.0% by weight and a net calorific value of about 10100 to about 10300 Kcal/Kg.

By the expression "jet fuel" where used herein is meant kerosene, light oils and medium oils for example that known as AVTUR fuel. AVTUR fuel is a medium oil distilling between 150° and 300° C. that distils at least 65% in volume at 250° C., has a flash point above 38° C., has a maximum aromatic content of 20% by volume, has been treated to have a kinematic viscosity of less than 15 cSt ($1.5 \times 10^{-5}$ m²/s) at −34° C. and has a freezing point not greater than −50° C.

The invention provides in one of its aspects a method of controlling foaming of a liquid hydrocarbon fuel comprising the inclusion in the hydrocarbon fuel of an antifoam agent comprising a polysiloxane polyoxyalkylene copolymer comprising siloxane units according to the general formulae

$$R_a SiO_{\frac{4-a}{2}} \tag{i}$$

and

$$R_b R'_c SiO_{\frac{4-(b+c)}{2}} \tag{ii}$$

in which each R represents a monovalent hydrocarbon group at least 80% of these groups being methyl, each $R'$ represents a substituent group according to the general formula $Q(OA)_n OZ$ in which Q represents a divalent group attached to the silicon atom, A represents an alkylene group, at least 80% of the groups OA being oxyethylene groups and Z represents a hydrogen atom or a group $OCR''$ in which $R''$ represents a monovalent hydrocarbon group, a has a value of 1, 2 or 3, b has a value of 0, 1 or 2, c has a value of 1 or 2, the sum of b and c is not greater than 3 and n has a value from 5 to 25, the copolymer having an average molecular formula such that the groups OA provide from about 25% to about 65% by weight of the calculated molecular weight of the copolymer.

In a method according to the invention, the hydrocarbon fuel is preferably a diesel fuel used as a fuel for motor vehicles e.g. cars and heavy goods vehicles, and marine use, or a jet fuel e.g. AVTUR used as a fuel for jet engines. However, a method according to the invention may also find use at least to a limited extent for controlling foaming of other hydrocarbon liquids, for example residual fuel oils having a viscosity at 38° C. of greater than 115" Redwood 1, light medium and heavy naphthas, vapourising oils and motor spirits. The invention is particularly beneficial in the control of foaming of hydrocarbon liquids and especially diesel fuels as they are pumped rapidly from one vessel to another in presence of air, and possibly in presence of water. Such circumstances may occur for example during transfer of materials through a supply pipe from one vessel to another, as required during separation of various grades of hydrocarbon liquids from crude oil or preparation of various grades of hydrocarbon liquid from selected feedstocks, and in transfer of hydrocarbon liquids from road tankers to static storage tanks.

The polysiloxane polyoxyalkylene copolymers may be used in a method according to the invention in any desired quantity and incorporated into the hydrocarbon liquid in any suitable manner. We prefer to add the copolymers in the form of a solution to the hydrocarbon liquid. The preferred copolymers are effective to reduce the tendency of hydrocarbon liquids to foam when used in quantities of 100 parts per million or less, for example in the range from about 1 to about 50 ppm by volume, the most preferred copolymers being effective when used in quantities of from 5 to 20 parts copolymer per million parts hydrocarbon liquid by volume.

The most effective foam controlling amount of copolymer employed is dependent on the structure of the copolymer. Polysiloxane polyoxyalkylene copolymers suitable for use in the invention include siloxane units according to the general formula $$R_a SiO_{\frac{4-a}{2}} \quad (i)$$

in which each R represents a monovalent hydrocarbon group. These units are present as chain units of the polysiloxane molecule and can also be present as terminal units of the polysiloxane molecule. Some of the R groups may be unsubstituted, saturated, aliphatic or aromatic hydrocarbon groups but not less than 80% of these R groups are methyl groups and most preferably each is a methyl group. Units according to the general formula (i) provide more than half of the units of the polysiloxane molecule and may provide for example from about 65% to about 92% of the units of the siloxane, more preferably about 78 to about 85% of the units.

Polysiloxane polyoxyalkylene copolymers suitable for use in the invention include siloxane units according to the general formula $$R_b R'_c SiO_{\frac{4-(b+c)}{2}} \quad (ii)$$

in which R represents a group as referred to above and R' represents a group according to the general formula $Q(OA)_n OZ$ (i.e. a group including oxyalkylene groups) in which each A represents a divalent hydrocarbon group, at least 80% of the A groups being ethylene groups and Z represents a hydrogen atom or a group OCR" in which R" represents a monovalent hydrocarbon group. The groups A are preferably all ethylene groups $CH_2CH_2$ derived for example from ethylene oxide. If desired oxyethylene oxypropylene copolymers may be used provided that at least 80% of the A groups are ethylene groups. Such polymeric oxyalkylene chains may have a random or block structure and may be represented thus:

$$Q(OC_2H_2)_p(OCH_3C_2H_3)_q OZ$$

The oxyalkylene chain is linked to the silicon atom of the siloxane chain by way of a divalent linkage, Q, selected so that it is sufficiently stable in use and does not adversely affect the foam controlling action of the copolymer. The linkage may be for example a substituted or unsubstituted, aromatic, alicyclic or aliphatic hydrocarbon, but most conveniently is an unsubstituted alkylene chain having 2 to about 8 chain carbon atoms. In those cases where oxyalkylene units other than oxyethylene units are present in the oxyalkylene chain, they may be used to provide up to 20% of the units of the oxyalkylene chain. However, compatibility characteristics may be adversely affected by inclusion of types and amounts of units other than oxyethylene units, and their inclusion is not preferred.

Suitable copolymers are those having a value of n in the range 5 to 25, the most preferred having a value of n in the range 5 to 15. Examples of suitable copolymers hereinafter referred to have on average about 7.5 or 12 oxyethylene units in each R' group and have the grouping $-(CH_2)_3-$ as linking group Q.

The terminal group OZ of the grouping R' may be OH or OOCR" where R" represents a monovalent hydrocarbon group for example a lower alkyl group for example methyl, ethyl or butyl: preferred copolymers include those in which the terminal group OZ is hydroxy or acetate.

In order for the copolymer to possess desirable properties, including for example desired compatibility characteristics, the copolymer molecule should have an appropriate balance of oleophilic and oleophobic groupings.

Thus the copolymers have average molecular formulae such that the groups OA provide from about 25% to about 65% by weight of the molecular weight of the copolymer as calculated from the average molecular formula, i.e. the calculated molecular weight. In order to achieve desired antifoam characteristics when used at low concentrations with diesel or jet fuel the quantity of groups R' present in the copolymer is selected in accordance with the number of oxyalkylene chain units OA present in each group R', i.e. the value of n. Thus where n has a value from 5 to 15, we prefer that the groups OA provide from about 25 to about 55% by weight of the calculated molecular weight of the copolymer. More specifically, where n has an average value of about 7.5 we prefer that the groups OA provide no more than about 45% by weight of the calculated molecular weight of the copolymer and preferably no less than 30% by weight of the calculated molecular weight of the copolymer, whereas where n has an average value of about 12 we prefer that the groups OH provide no more than about 55% by weight of the calculated molecular weight of the copolymer and preferably no less than about 40% by weight of the calculated molecular weight of the copolymer. The calculated molecular weight of the copolymer may conveniently be in the range 2000 to 5000, but if copolymers of higher molecular weight are employed the larger or smaller quantities of units OA may be employed than are most suitable for lower molecular weight copolymers of similar structure.

Units of formula (ii) are preferably present in the copolymers to an extent of from about 8.5% to about 35% of the siloxane units. If units according to the formula (ii) are present to an extent of more than about 35% or of less than about 8.5% of the siloxane units, the copolymers tend to exhibit profoaming rather than antifoam characteristics when incorporated in diesel fuel or AVTUR jet fuel in quantities of about 100 parts per million by volume. When they are to be incorporated in smaller quantities e.g. 50 ppm or less, the copolymers preferably contain more than about 11% and less than about 30% units of the formula (ii), and more preferably the units (ii) provide from about 15% to about 22% of the units of the copolymer.

Preferred copolymers include those according to the average general formula $$Me_3SiO(Me_2SiO)_x(MeR'SiO)_ySiMe_3$$

wherein each Me represents a methyl group. The ratio of x:y may lie in the range 1:1 to 11:1 and preferably lies in the range 1:1 to 9:1. More preferably the ratio x:y lies in the range 3:1 to 7:1 and more preferably in the range 3:1 to 5:1 when the copolymer is to be used as an antifoam in jet fuel. By exploiting the preferred ratios it is possible to achieve a good level of antifoam properties when the copolymers are employed in quantities of less than 100 parts per million of hydrocarbon fuel e.g. 40 ppm or less.

In a method according to the invention, the polysiloxane polyoxyalkylene copolymer is preferably added in liquid form to the hydrocarbon liquid. Many of the materials suitable for use in the invention are liquids per se. These and the less liquid materials may be diluted with solvent to aid addition and dispersion in the hydrocarbon liquid. No other additives are necessary to render the copolymers effective as antifoams and thus the antifoams are regarded as consisting essentially of the selected copolymers. The polysiloxane polyoxyalkylene copolymer is preferably a liquid per se and may suitably have a viscosity of less than 1000 cS at 25° C. Suitable materials include those having a viscosity of about 200 to about 400 cS at 25° C. The present invention extends to hydrocarbon fuels treated by a method according to the invention.

The invention also provides a liquid hydrocarbon fuel comprising an antifoam agent comprising a polysiloxane polyoxyalkylene copolymer comprising siloxane units according to the general formulae $$R_aSiO_{\frac{4-a}{2}} \quad (i)$$

and $$R_bR'_cSiO_{\frac{4-(b+c)}{2}} \quad (ii)$$

in which each R represents a monovalent hydrocarbon group at least 80% of these groups being methyl, each R' represents a substituent group according to the general formula Q(OA)$_n$OZ in which Q represents a divalent group attached to the silicon atom, A represents an alkylene group, at least 80% of the groups OA being oxyethylene groups and Z represents a hydrogen atom or a group OCR" in which R" represents a monovalent hydrocarbon group, a has a value of 1, 2 or 3, b has a value of 0, 1 or 2, c has a value of 1 or 2 and the sum of b and c is not greater than 3 and n has a value from 5 to 25, the copolymer having an average molecular formula such that the groups OA provide from about 25 to about 65% by weight of the copolymer.

Siloxanes having units (i) and (ii) are of generally known type and may be prepared according to methods known in the art. For example by condensation and equilibration of appropriate precursors one may provide a polysiloxane having units according to the general formulae Me$_3$SiO$_{\frac{1}{2}}$, Me$_2$SiO and MeHSiO where each Me represents a methyl group. An oxyalkylene material having olefinic unsaturation e.g. vinylic or allylic unsaturation may be caused to react with this polysiloxane via a hydrosilylation reaction to provide a polysiloxane polyoxyalkylene copolymer comprising units Me$_3$SiO$_{\frac{1}{2}}$, Me$_2$SiO and MeR'SiO (a=3, b=1, c=1).

The following examples are selected for description to illustrate the present invention. In the examples selected polysiloxane polyoxyalkylene copolymers were employed to control foaming of diesel and jet fuels.

Where used herein, the symbol Me represents a methyl group.

The first example polysiloxane polyoxyalkylene copolymer was according to the average formula $$Me_3SiO(Me_2SiO)_{8.6}(MeR'SiO)_{3.6}SiMe_3$$

where R' represents $$-(CH_2)_3(OCH_2CH_2)_{12}OH$$

and had a molecular weight of 3124, a viscosity at 25° C. of 400 cS and contained 60.9% oxyethylene groups by weight of the copolymer.

The second example polysiloxane polyoxyalkylene copolymer was according to the average formula $$Me_3SiO(Me_2SiO)_{8.6}(MeR'SiO)_{3.6}SiMe_3$$

where R' represents $$-(CH_2)_3(OCH_2CH_2)_{12}OCOCH_3$$

and had a molecular weight of 3275, a viscosity at 25° C. of 250 cS and contained 58% oxyethylene groups by weight of the copolymer.

Ten further example polysiloxane polyoxyalkylene copolymers according to the general formula $$Me_3SiO(Me_2SiO)_x(MeR'SiO)_ySiMe_3$$

and as more fully characterised in Tables 1 and 1A were prepared in the following way. A copolymer having the average molecular formula $$Me_3SiO(Me_2SiO)_x(MeHSiO)_ySiMe_3$$

was dissolved in isopropyl alcohol together with an allyl oxyethylene glycol or allyl oxyethylene acetate to provide a solution containing 75% solids. The allyl oxyethylene compound contained on average 7.5 oxyethylene units per molecule. This material was employed in an amount 10% in excess of that calculated to be required to react with all SiH present in the polysiloxane. The solution also contained 0.1% of the total solids of sodium acetate. An addition reaction was induced by heating the solution to 70° C. and adding $10^{-5}$ moles chloroplatinic acid per mole of SiH present.

The reactants were refluxed (about 90° C.) for 6 to 12 hours. The product was cooled, stripped of solvent and filtered. No special steps were taken to remove the residual allyl oxyethylene glycol.

TABLE 1

Composition of Example Copolymers 3 to 8

| Copolymer | Example | | | | | |
|---|---|---|---|---|---|---|
| | 3 | 4 | 5 | 6 | 7 | 8 |
| X | 9 | 14 | 3 | 6 | 12 | 18 |
| Y | 3 | 2 | 5 | 3 | 3 | 3 |
| Z | Ac | Ac | Ac | Ac | Ac | Ac |
| Calculated molecular weight of the copolymer (c) | 2298 | 2178 | 2834 | 2076 | 2520 | 2964 |
| Number average molecular weight of the copolymer ($M_n$) | 1710 | 1662 | 750 | 1850 | 1779 | 1700 |
| Weight average molecular weight of the copolymer ($M_w$) | 3457 | 4268 | 4705 | 4140 | 5466 | 4290 |
| % by weight oxyethylene groups of (c) | 43 | 30.3 | 58.2 | 47.7 | 39.3 | 33.4 |
| % units MeR'SiO of the copolymer | 21.4 | 11 | 50 | 27.3 | 17.6 | 13 |
| Ratio $\frac{x}{y}$ | 3 | 7 | 0.6 | 2 | 4 | 6 |

Q in each of these examples was $-(CH_2)_3-$.
A in each of these examples was $-(CH_2)_2-$.
$\underline{n}$ in each of these examples was 7.5.
Ac signifies $-\underset{\underset{O}{\|}}{C}-CH_3$

TABLE 1A

Composition of Example Copolymers 9 to 14

| Copolymer | Example | | | | | |
|---|---|---|---|---|---|---|
| | 9 | 10 | 11 | 12 | 13 | 14 |
| X | 30 | 9 | 14 | 3 | 22 | 36 |
| Y | 3 | 3 | 2 | 5 | 2 | 16 |
| Z | Ac | H | H | H | Ac | Ac |
| Calculated molecular weight of the copolymer (c) | 3852 | 2172 | 2094 | 2624 | 2770 | 10666 |
| Number average molecular weight of the copolymer ($M_n$) | 3000 | 1438 | 1898 | 721 | 1800 | 3700 |
| Weight average molecular weight of the copolymer ($M_w$) | 8400 | 6014 | 11046 | 2312 | 5040 | 24700 |
| % by weight oxyethylene groups of (c) | 25.7 | 45.6 | 31.5 | 62.9 | 23.8 | 49.5 |
| % units MeR'SiO of the copolymer | 8.6 | 21.4 | 11 | 50 | 7.7 | 29.6 |
| Ratio $\frac{x}{y}$ | 10 | 3 | 7 | 0.6 | 11 | 2.25 |

Q in each of these examples was $-(CH_2)_3-$.
A in each of these examples was $-(CH_2)_2-$.
$\underline{n}$ in each of these examples was 7.5.
Ac signifies $-\underset{\underset{O}{\|}}{C}-CH_3$ The effectiveness of the first and second example copolymers as foam controlling agents was assessed using a test procedure designed to simulate the foaming of hydrocarbon liquids during inter alia for example high speed (500 litres per second) passage from a road tanker delivery pipe into the pump of a filling station. In this test 100 ml of hydrocarbon liquid provided by commercial diesel fuel purchased as a lorry fuel were charged to a graduated measuring cylinder together with a desired amount of polysiloxane polyoxyalkylene copolymer. Dry nitrogen was bubbled through the liquid at a rate of 50 ml/min via a sintered glass bubbler (No. 3-Baird and Tatlock) for two minutes. The bubbler was removed and the gas feed rate adjusted to 300 ml/min. The bubbler was inserted in the hydrocarbon liquid and the gas bubbled through the hydrocarbon liquid at a rate of 300 ml/min for a further two minutes. During this further two minutes the elapsed time was recorded as the foam passed successive 10 ml graduations of the measuring cylinder. The behaviour of the foam without copolymer present (blank) and with various amounts of each copolymer present were assessed. Each example copolymer was found to perform as a defoamer, the second example copolymer showing the better general performance.

EXAMPLE 1

The first example copolymer was tested as referred to above. The elapsed time in seconds was determined for the blank and for a sample including 50 ppm by volume of the first example copolymer. Results were as follows:

| Foam Volume | Elapsed Time: Seconds | |
|---|---|---|
| Cylinder Graduations (ml) | Blank | 50 ppm |
| 130 | 5 | 10 |
| 150 | 12 | 31 |
| 170 | 23 | 60 |
| 180 | — | 90 |
| 190 | 47 | 120 |
| 195 | 60 | — |
| 200 | 68 | — |
| 205 | 90 | — |
| 210 | 102 | — |
| 210 | 120 | — |

EXAMPLE 2

The second example copolymer was tested as referred to above. The elapsed time in seconds was determined for the blank and for samples containing 1 ppm and 5 ppm by volume of the second example copolymer. Results were as follows:

| Foam Volume | Elapsed Time: Seconds | | |
|---|---|---|---|
| Cylinder Graduations (ml) | Blank | 1 ppm | 5 ppm |
| 130 | 5 | 7 | 11 |
| 140 | — | — | 21 |
| 150 | 11 | 18 | 60 |
| 152 | — | — | 90 |
| 152 | — | — | 120 |
| 170 | 18 | 52 | — |
| 170 | — | 60 | — |
| 175 | — | 90 | — |
| 175 | — | 120 | — |
| 190 | 30 | — | — |
| 200 | 40 | — | — |
| 210 | 60 | — | — |
| 220 | 81 | — | — |
| 225 | 120 | — | — |

EXAMPLE 3

The effectiveness of example copolymers 3 to 14 as antifoam materials was examined in freshly purchased Shell diesel lorry fuel in the following way. To 100 ml samples of the liquid hydrocarbon fuel there were added 10, 20, 40 and 100 parts of the copolymer by volume per million parts liquid hydrocarbon fuel. The copolymers were added as solutions in toluene. Each sample was placed in a graduated measuring cylinder and dry nitrogen was bubbled through the liquid via a sintered glass bubbler (No. 3-Baird and Tatlock) for two minutes and the rate of flow was adjusted to 310 ml/min. The bubbler was removed and the foam allowed to collapse. The bubbler was inserted in the hydrocarbon liquid and the gas bubbled through the hydrocarbon liquid at a rate of 310 ml/min for a further two minutes. During this further two minutes the volume of foam produced was recorded at intervals of 15 seconds. The maximum volumes of foam produced without copolymer present (blank) and with various amounts of each copolymer present were recorded. The maximum volume of foam produced in presence of copolymer is recorded in Table 2 as a percentage of the maximum volume of foam produced in absence of copolymer.

As can be seen from Table 2, example copolymers 5, 12 and 13 were ineffective as antifoams, example copolymer 9 was ineffective as an antifoam at lower concentrations whereas the other example copolymers were all effective antifoams at concentrations from 10 to 100 ppm. It will also be apparent that example copolymers 3, 7, 10 and 14 were effective at various concentrations whereas example copolymers 4, 6, 8 and 11 should be used in quantities of 40 to 100 ppm to be effective to a comparable extent.

EXAMPLE 4

The effectiveness of example copolymers 3 to 14 as antifoam materials was examined in freshly obtained AVTUR jet fuel. The method employed was as described in example 3 except that air was used instead of nitrogen, and the air was passed through the samples at a rate of 2000 ml per minute. The results are shown in Table 3.

As can be seen from Table 3 (which due to the nature of the test shows rather high foam height results) example copolymers 12 and 13 were ineffective as antifoams. Example coploymers 5 and 9 were the least effective of the others as antifoams and example copolymers 4,8 and 11 were significantly less effective at lower concentrations.

TABLE 2

Results of foaming tests of copolymers in diesel fuel (foam volume as % of blank foam volume).

| Example Copolymer | At Concentration of | | | |
| --- | --- | --- | --- | --- |
|  | 10 ppm | 20 ppm | 40 ppm | 100 ppm |
| 3 | 24 | 14 | 12 | 8 |
| 4 | 60 | 49 | 16 | 9 |
| 5 | 114 | 112 | 122 | 143 |
| 6 | 54 | 49 | 43 | 26 |
| 7 | 17 | 13 | 8 | 7 |
| 8 | 47 | 35 | 18 | 18 |
| 9 | 120 | 105 | 80 | 43 |
| 10 | 16 | 11 |  | 3 |
| 11 | 84 | 41 | 6 | 2 |
| 12 | 120 | 120 | 118 | 114 |
| 13 | 175 | 185 | 196 | 141 |

TABLE 2-continued

Results of foaming tests of copolymers in diesel fuel (foam volume as % of blank foam volume).

| Example Copolymer | At Concentration of | | | |
| --- | --- | --- | --- | --- |
|  | 10 ppm | 20 ppm | 40 ppm | 100 ppm |
| 14 | 26 | 17 | 12 | 8 |

TABLE 3

Results of Foaming Tests of Copolymers in Jet Fuel (Foam Volume as % of Blank Foam Volume)

| Example Copolymer | At Concentration of | | | |
| --- | --- | --- | --- | --- |
|  | 10 ppm | 20 ppm | 40 ppm | 100 ppm |
| 3 | 61 | 55 | 51 | 37 |
| 4 | 94 | 86 | 71 | 32 |
| 5 | 100 | 88 | 82 | 83 |
| 6 | — | — | — | — |
| 7 | 59 | 48 | 27 | 9 |
| 8 | 86 | 67 | 44 | 26 |
| 9 | 127 | 135 | 120 | 78 |
| 10 | 64 | 53 | 35 | 14 |
| 11 | 83 | 43 | 18 | 12 |
| 12 | 115 | 113 | 113 | 103 |
| 13 | 147 | 165 | 194 | 222 |
| 14 | 49 | 47 | 39 | 27 |

That which is claimed is:

1. A method for controlling foaming of a liquid hydrocarbon fuel comprising the inclusion in the hydrcarbon fuel of an antifoam agent consisting essentially of a siloxane copolymer having the average general formula

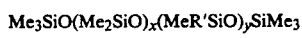

$$Me_3SiO(Me_2SiO)_x(MeR'SiO)_ySiMe_3$$

wherein Me represents a methyl radical, R' represents the group $Q(OCH_2CH_2)_nOZ$ in which Q represents an alkylene group having from 2 to 8 carbon atoms, n is 5 to 25 and Z represents hydrogen or a group OCR" in which R" denotes a monovalent hydrocarbon group, and wherein the ratio of x:y is in the range of 1:1 to 9:1.

2. A method according to claim 1 wherein the ratio of x:y is in the range from 3:1 to 7:1.

3. A method according to claim 1 wherein the copolymer is included to an extend of 5 to 50 parts by volume per million parts liquid hydrocarbon fuel.

4. A method according to claim 1 wherein the liquid hydrocarbon fuel is diesel fuel or jet fuel.

5. A hydrocarbon fuel treated by a method according to claim 1.

6. A liquid hydrocarbon fuel comprising an antifoam agent consisting essentially of a siloxane copolymer having the average general formula

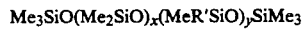

$$Me_3SiO(Me_2SiO)_x(MeR'SiO)_ySiMe_3$$

wherein Me represents a methyl radical, R' represents the group $Q(OCH_2CH_2)_nOZ$ in which Q represents an alkylene group having from 2 to 8 carbon atoms, n is 5 to 25 and Z represents hydrogen or a group OCR" in which R" denotes a monovalent hydrocarbon group, and wherein the ratio of x:y is in the range of 1:1 to 9:1.

7. A fuel according to claim 6 wherein the ratio of x:y is in the range from 3:1 to 7:1.

8. A fuel according to claim 6 wherein the liquid hydrocarbon fuel is diesel fuel or jet fuel and the copolymer is present to an extent of 5 to 50 parts by volume per million parts liquid hydrocarbon fuel.

* * * * *